May 21, 1963     M. I. MASTERSON, JR     3,090,635

TRANSPORTING DOLLY FOR SHEET MATERIAL

Filed Feb. 15, 1962

INVENTOR.
MELVIN I. MASTERSON, JR.

BY

ATTORNEY

United States Patent Office 3,090,635
Patented May 21, 1963

3,090,635
TRANSPORTING DOLLY FOR SHEET MATERIAL
Melvin I. Masterson, Jr., 1708 Seabright Ave.,
Long Beach, Calif.
Filed Feb. 15, 1962, Ser. No. 173,384
1 Claim. (Cl. 280—47.13)

This invention relates to a transporting dolly for sheet material, such as wall board and the like, which is used in the building industry. Large panels of wall board are frequenly transported by one man from place to place in a building, and since these sheets or panels are relatively large and quite heavy they are quite difficult for one man to move about, particularly over various structural parts of the building, between studding and the like.

An object of my invention is to provide a novel transporting dolly upon which sheet material or panels may be partially supported and transported from place to place as required.

Another object of my invention is to provide a novel transporting dolly which will permit easy steering of the panel supported thereon, since the panel rests in a groove or recess formed in the body of the dolly.

Another object of my invention is to provide a novel transporting dolly which can be engaged and lifted by the handling hook of the workman in order to raise the panel and the dolly and carry it over a floor plate, stud, or the like.

Still another object of my invention is to provide a novel transporting dolly which is simple in construction, inexpensive to manufacture, and effective in operation.

Other objects, advantages and features of invention may appear from the accompanying drawing, the subjoined detailed description and the appended claims.

Figure 1:
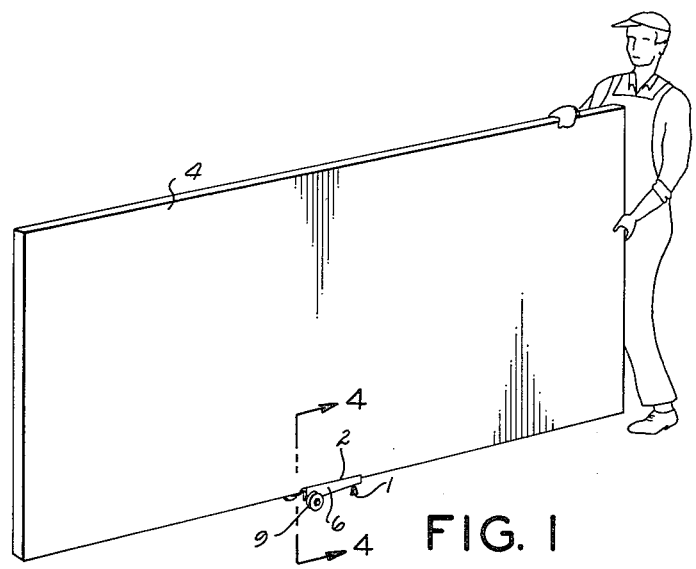
FIGURE 1 is a perspective view of my dolly in use on a sheet or panel of material.
Figure 2:
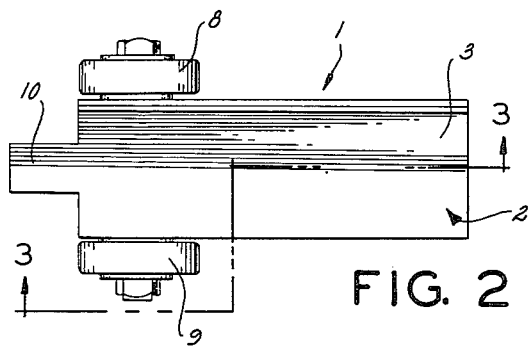
FIGURE 2 is a top plan view of my transporting dolly.
Figure 3:
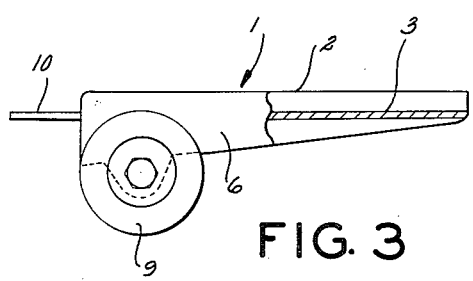
FIGURE 3 is a side elevation of the same with parts broken away to show interior construction taken from line 3—3 of FIGURE 2.
Figure 4:
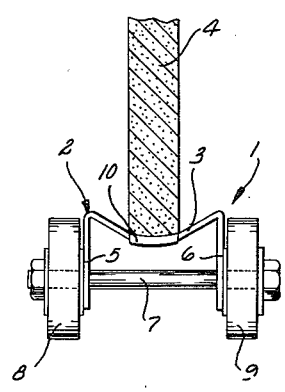
FIGURE 4 is an end view of the same taken from the line 4—4 of FIGURE 1.

Referring more particularly to the drawing, my transporting dolly 1 consists of an elongated bed 2, preferably formed of metal, and this bed is formed with a longitudinally extending groove, recess, or indentation 3 which extends the entire length of the bed, and has a sufficient depth and width to receive an edge of the panel or sheet 4 which is to be transported. The bed 2 of the dolly, therefore, is somewhat channel shaped and will effectively receive the sheet 4 so that that sheet may be guided from side to side as required, without sliding off of the bed 2. Both side edges 5—6 are bent downwardly to form a supporting structure in which the shaft 7 is mounted. Wheels 8 and 9 are journaled on the shaft 7 and thus permit the dolly to be rolled from place to place with the sheet or panel 4 supported thereon. The workman supports one end of the sheet 4 and the major weight of that sheet or panel is supported on the dolly 1, substantially as shown in FIGURE 1.

If it is necessary to lift the sheet 4 and the dolly 1 over some obstruction, such as a floor plate or the like, the workman carries a hook, not shown, which he uses to lift the panel 4 into place. A lug 10 projects forwardly from the bed 1, and if it is necessary to raise the wheels 8 and 9 of the dolly over an obstruction, the hook is placed under the lug 10 and thus both the plate or panel 4 and the dolly 1 can be simultaneously raised over a relatively small obstruction.

Having described my invention, I claim:

A transporting dolly for sheet material consisting of, an elongated bed,
   said bed having an indentation therein extending the length thereof to receive part of one edge of a sheet material supported thereon, said indentation being open at both ends, integral side edges of said bed bent downwardly to provide a shaft supporting structure,
   a shaft mounted in said downwardly bent edges adjacent one end of said bed, a wheel journaled on each end of the shaft,
   and a lug projecting horizontally from one end of said bed and integral with said bed, said lug being at the end of the bed adjacent the wheels, and said lug being arranged in substantially the same horizontal plane at the bottom of said indentation.

References Cited in the file of this patent
UNITED STATES PATENTS

| 1,515,824 | Best | Nov. 18, 1924 |
| 2,816,771 | Hunt | Dec. 17, 1957 |